(12) United States Patent
Fischer et al.

(10) Patent No.: US 7,394,901 B2
(45) Date of Patent: Jul. 1, 2008

(54) METHOD FOR EXCHANGING AUTHENTICATION INFORMATION BETWEEN A COMMUNICATION ENTITY AND AN OPERATOR SERVER

(75) Inventors: Jean-Bernard Fischer, Le Kremlin-Bicetre (FR); Christophe Giraud, Paris (FR)

(73) Assignee: Oberthur Technologies, Paris (FR)

(*) Notice: Subject to any disclaimer, the term of this patent is extended or adjusted under 35 U.S.C. 154(b) by 246 days.

(21) Appl. No.: 10/507,625

(22) PCT Filed: Mar. 12, 2003

(86) PCT No.: PCT/FR03/00789

§ 371 (c)(1),
(2), (4) Date: Sep. 14, 2004

(87) PCT Pub. No.: WO03/079714

PCT Pub. Date: Sep. 25, 2003

(65) Prior Publication Data

US 2005/0125662 A1    Jun. 9, 2005

(30) Foreign Application Priority Data

Mar. 15, 2002 (FR) .................................. 02 03242

(51) Int. Cl.
*H04L 9/00* (2006.01)
*G06F 1/02* (2006.01)
(52) U.S. Cl. .................. 380/270; 380/46; 708/250; 713/169
(58) Field of Classification Search ............... 380/270, 380/46; 708/250; 713/169
See application file for complete search history.

(56) References Cited

U.S. PATENT DOCUMENTS

| 6,061,791 A | 5/2000 | Moreau |
| 2002/0018569 A1 | 2/2002 | Panjwani et al. |
| 2002/0078345 A1 | 6/2002 | Sandhu et al. |
| 2002/0120844 A1* | 8/2002 | Faccin et al. ............ 713/168 |
| 2002/0197979 A1* | 12/2002 | Vanderveen ............ 455/410 |

FOREIGN PATENT DOCUMENTS

GB    2 342 817    4/2000

OTHER PUBLICATIONS

International Standard, ISO 8732, Organisation internationale de normalization, 1988, pp. 1-72.
Chapter 7, Block Ciphers, Sections 7.4 through 7.8, pp. 250-282.

(Continued)

*Primary Examiner*—Nasser Moazzami
*Assistant Examiner*—Mohammad Reza
(74) *Attorney, Agent, or Firm*—Young & Thompson

(57) ABSTRACT

An exchange of information between a communication entity e.g. a mobile telephone and the operator server upon which it is dependent, in order to carry out authentication operations by exchanging keys and using cryptography algorithms. According to the invention, an algorithm is used, comprising: algorithmic treatments using, as input data, all or part of a random number and operating keys derived from two keys, and a combined treatment using data derived from algorithmic treatments in order to provide results to enable the linkage.

20 Claims, 2 Drawing Sheets

OTHER PUBLICATIONS

Figure 1:
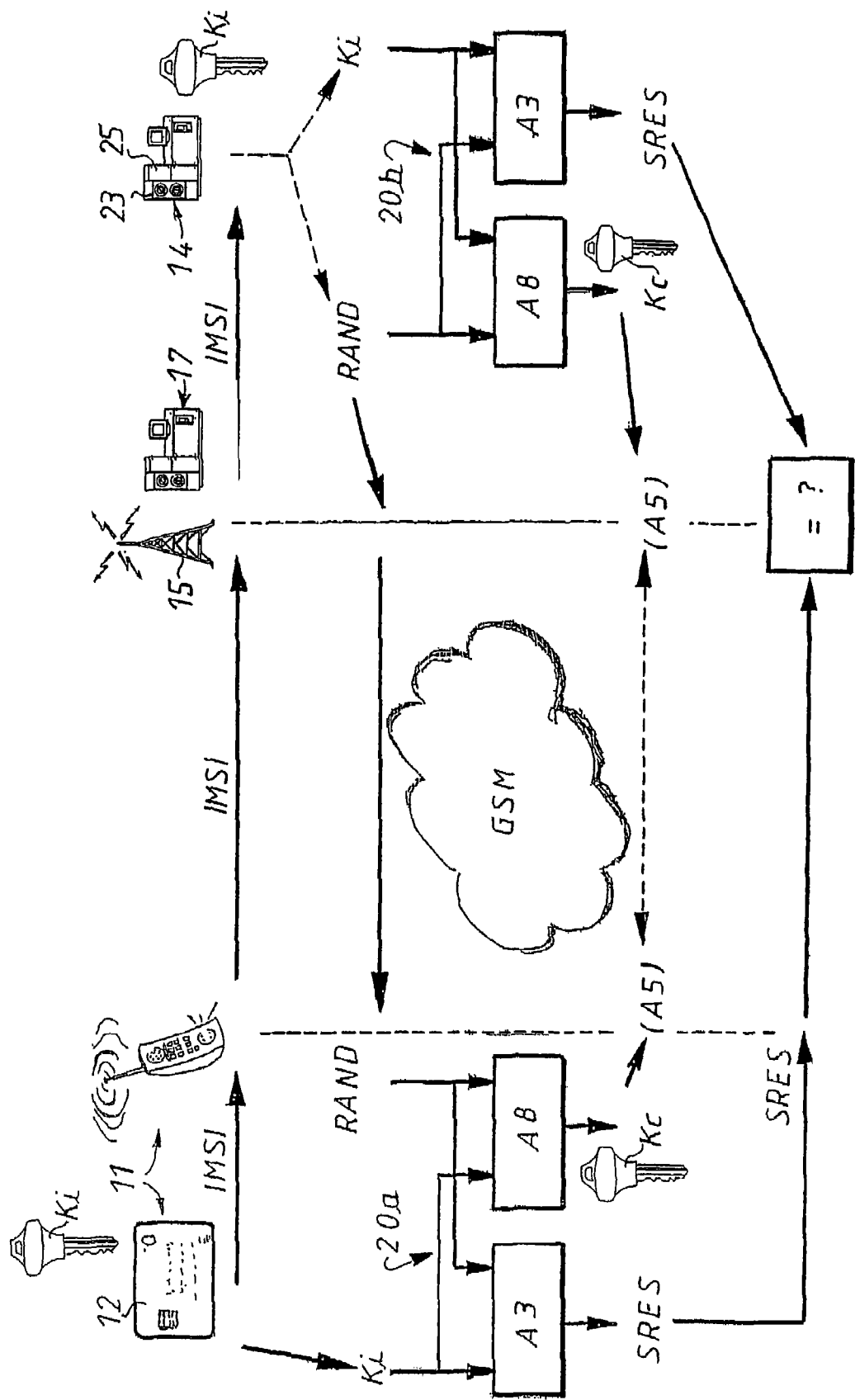

Chapter 9, Hash Functions and Data Integrity, Sections 9.1 through 9.2, pp. 321-331.

Chapter 18, "Fonctions de hachage a sens unique" (One-Way Hash Functions), pp. 454-483.

Financial Services Technical Publication Developed By Accredited Standards Committee X9—Financial Services, Financial Institution Key Management (Wholesale), Global Engineering Documents, ANSI X9.17, 1995, pp. 1-152.

* cited by examiner

METHOD FOR EXCHANGING AUTHENTICATION INFORMATION BETWEEN A COMMUNICATION ENTITY AND AN OPERATOR SERVER

The invention relates to a method of exchanging authentication information between a communication entity, in particular a wireless mobile communication entity, and a corresponding operator server with which a call may be set up, possibly through the intermediary of a third party network. The invention applies in particular to exchanging information between a mobile telephone and its operator server, in particular to execute authentication operations by exchanging keys and using cryptography algorithms to verify the rights of said entity before setting up a call.

In the field of mobile telephones, a mobile telephone user must enter into communication with his operator server. To this end, radio communication is set up between the mobile entity (the mobile telephone) and the operator server, generally through the intermediary of a third party network (and the operator server thereof) whose telecommunication means are best able to receive the signal emitted by the mobile telephone, given its location at the time it seeks to set up the call.

Once the call has been set up, an authentication phase begins to verify the rights of the mobile entity. A telephone conversation is authorized if the cryptographic authentication process succeeds. For example, the GSM group has defined a function known as the $A_3$-$A_8$ function to implement the cryptographic process that enables the operator server concerned to authenticate a mobile telephone seeking to connect to it. This function is executed by a microcircuit card in the mobile telephone known as the subscriber identity module (SIM). In addition to authenticating the user, the $A_3$-$A_8$ function generates a temporary key $K_c$ for securing subsequent communication between the telephone and the operator server by encrypting a portion of the traffic. The algorithms for implementing this function are specific to the operator. The input to this kind of algorithm comprises a random number of 16 bytes and a key of 16 bytes. The $A_3$ output is an authentication value SRES of 4 bytes and the $A_8$ output is a key $K_c$ of 8 bytes. The GSM standard describes one example of an algorithm implementing the $A_3$-$A_8$ function known as the COMP 128-1 algorithm. However, it has been demonstrated that this algorithm is easy to break. The invention proposes another solution providing an algorithm that is more secure, offers improved performance, and is compatible with the GSM standard, i.e. that uses the same inputs and generates the same outputs. The invention is also aimed at an algorithm that is easy to implement, in particular on the operator server side.

The invention relates more particularly to a method of exchanging authentication information between an operator server and a communication entity, typically a mobile telephone, in which said entity and said server have the same first key and said server generates a random number and sends it to said entity for the parallel implementation of an algorithm in said entity and said server and for comparison of the results generated in said entity and said server in order to validate said authentication, which method is characterized in that said entity and said server comprise at least one common secret second key and said algorithm implemented in said entity and said server comprises:

algorithmic processes using as input data all or a portion of said random number and operating keys derived from said first and second keys, and
  a combinatorial process using data derived from said algorithmic processes to generate corresponding precited results.

In particular, said algorithm may comprise two similar algorithmic processes, cited above, each using two operating keys.

For example two respective portions of said random number, such as two separate portions of said number, may be used as input data for the two similar algorithmic processes referred to above. In particular, the less significant bytes of said random number may be used as input data for one of the two similar processes and the more significant bytes of the same random number may be used as input data for the other of the two similar processes.

A number of prior art algorithmic processes may be used, for example an "encryption function" algorithm, well known examples of which include the DES, RSA and AES algorithms, or a "key dependent one-way hashing function" algorithm, better known in the art as the message authentication code (MAC) algorithm. A hashing function of the above kind is described in the following books:

Alfred J. Menezes, Paul C. van Oorschot, Scott A. Vanstone, "Handbook of Applied Cryptography", 1997, pages 325-326; and
  Bruce Schneier, "Crytopgraphie Appliqué" ["Applied cryptography"], 2nd edition, John Wiley & Sons, Inc., 1996, pages 479-480.

It is at present considered to be advantageous for each of said two similar algorithmic processes to execute a triple DES (3 DES) algorithm known in the art.

A triple DES algorithm using two keys is described in the following documents:

ANSI X9.17, American National Standard—Financial institution key management (wholesale), ASC X9 Secretariat—American Bankers Association, 1985;
  ISO 8732, Banking—Key management (wholesale), International Organization for Standardization, Geneva, Switzerland, 1987 (first edition, confirmed 1992); and
  Alfred J. Menezes, Paul C. van Oorschot, Scott A. Vanstone, "Handbook of Applied Cryptography", 1997, page 272.

The secret second key referred to above may be called a diversification key in that it is specific to a particular operator server and to all the telephone entities attached thereto. Another operator server and all the corresponding mobile telephones could use the same type of algorithm with a different secret key or diversification key.

Figure 2:
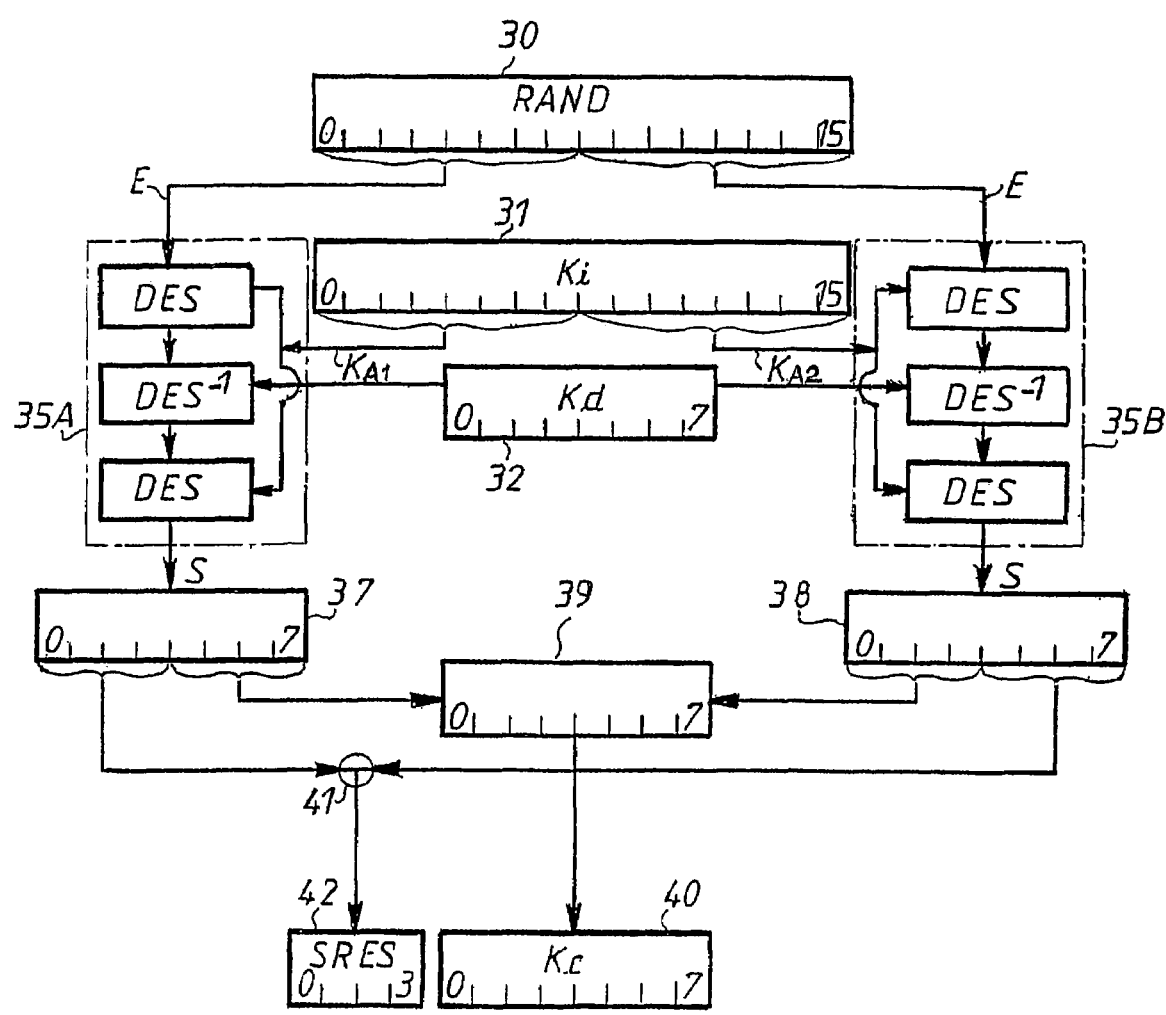

The invention will be better understood and other advantages of the invention will become more clearly apparent in the light of the following description of a mobile telephone network embodying the principle of the invention, which description is given by way of example and with reference to the appended drawings, in which:

FIG. 1 is a diagram depicting exchanges of information between a mobile telephone and an operator server via a third party network; and FIG. 2 is a block diagram of an algorithmic processing cell implementing the $A_3$-$A_8$ function of the method according to the invention.

FIG. 1 shows the main entities involved in a process of exchange of information between a mobile telephone that subscribes to a mobile telephone network and an operator server of the network. The mobile telephone 11 comprises a short range transceiver and a microcircuit card 12 in which data and authentication algorithms are stored, among other things. The operator server 14 of the network to which the owner of the mobile telephone subscribes is generally situated at too great a distance for direct radio communication with the mobile telephone to be possible. For this reason communication is often established with a radio relay station 15 of a third party network connected to an operator server 17 capable of processing information and transmitting it to the operator server 14 of the network to which the mobile telephone belongs.

The microcircuit card includes, in particular, means 20a for executing software capable of implementing the $A_3$-$A_8$ function, i.e. of generating the value SRES and a key $K_c$. The operator server contains equivalent means 20b. The microcircuit card further contains a key $K_i$ specific to the owner of the mobile telephone. The operator server manages a database 23 containing a list of all subscribers and the corresponding keys $K_i$.

At the time of a connection attempt, the mobile telephone 11 transmits in clear an international mobile subscriber identity (IMSI) number that is received by the third party network and forwarded by the latter to the operator server 14. The operator server uses this identification number to consult the database containing the list of subscribers and retrieve the key $K_i$ stored in the memory of the microcircuit card 12. In response, the operator server generates a random number RAND and forwards it to the mobile telephone via the third party network.

From this moment, the mobile telephone 11 and the operator server 14 are in possession of the same input data, namely the random number RAND and the key $K_i$, on the basis of which the same $A_3$-$A_8$ algorithm may be executed. The authentication algorithm is executed both in the microcircuit card of the mobile telephone and in an authentication unit of the operator server. If authentication succeeds, the results SRES and $K_c$ are identical in the telephone and in the operator server. More particularly, the result SRES is an authentication word and $K_c$ is a key that will be used as an encryption key for a function $A_s$ for encrypting certain traffic data during the telephone call between the mobile telephone and the operator server. The authentication word SRES generated in the microcircuit card is sent to the operator server 17 of the third party. The authentication word SRES generated by the operator server 14 is sent to the operator server 17 of the third party network, in which the comparison is effected. Similarly, confidential traffic data is exchanged between the mobile telephone and the operator server 17 of the third party network, which receives the key $K_c$ from the operator server 14.

This mode of operation is known in the art and conforms to the GSM standard.

FIG. 2 shows the means implemented in the card and in the authentication unit for executing the method according to the invention employing the algorithm implementing the $A_3$-$A_8$ functions defined by the standard. The random number RAND of 16 bytes is loaded into a register 30. A first key $K_i$ of 16 bytes is loaded into a register 31. This key $k_i$ is specific to the subscriber owning the mobile telephone 11 concerned and may also be retrieved from the database of the operator server 14.

A register memory 32 of 8 bytes contains a common secret second key $K_d$ representative of the operator server 14. In other words, this second key is stored in each SIM card 12 of a user subscribing to the operator server. The latter naturally holds in its memory the same secret key $K_d$. Another operator server belonging to another network could use the same algorithm but would have to use a different second key. Indeed the means employed comprise two similar algorithmic processing units $35_A$, $35_B$ each having an input E and an output S and receiving two operating keys derived from said first and second keys $K_i$ and $K_d$. More particularly, two separate portions (comprising the same number of bytes in the present example) of the random number RAND provide input data for the respective algorithmic processing units. In the present example, the less significant bytes of the random number RAND constitute input data for one of the two processing units (here the processing unit $35_A$) and the more significant bytes of the same random number constitute input data for the other of the two units (here the unit $35_B$). Similarly, in the present example, the less significant bytes of the key $K_i$ are used as a first operating key $K_{A1}$ of one of the two units and the more significant bytes of the same key $K_i$ are used as the first operating key $K_{A2}$ of the other of the two units. The two keys $K_{A1}$ and $K_{A2}$ have the same number of bytes and are two separate portions of the key $K_i$. The second key $K_d$ constitutes the second operating key of each of the two units $35_A$, $35_B$. The output of the unit $35_A$ is connected to a register 37 of 8 bytes and the output of the other unit $35_B$ is connected to a register 38 of 8 bytes. The intermediate results stored in the two registers 37, 38 constitute data for a combinatorial process that generates the results, namely the name SRES and the key $K_c$. More specifically, in the present example, the four less significant bytes of the register 37 and the four more significant bytes of the register 38 are combined in an intermediate register 39 of 8 bytes to constitute a word of 8 bytes that forms the key $K_c$. The key $K_c$ is copied into an output register 40. The less significant bytes of the register 37 and the more significant bytes of the register 38 are combined by an exclusive-OR circuit 41 and the result is sent to an output register 42 of 4 bytes in which the authentication word SRES may be read.

In the present example, the two similar algorithmic processing units constitute a triple DES (data encryption standard) function that is known in the art. The DES encryption function is well known in the art and may be associated with its inverse function $DES^{-1}$. The triple DES function applies successively to the input data a DES algorithm governed by a first key $K_1$, a $DES^{-1}$ algorithm governed by a second key $K_2$, and a DES algorithm governed by the first key $K_1$. In the present example, the key $K_1$ is the operating key derived from the key $K_i$ and the key $K_2$ is the diversification key $K_d$.

As mentioned above, the triple DES function represented in FIG. 2 may be replaced by some other prior art encryption function or by a key-dependent one-way hashing function. This kind of algorithmic processing may be used by different operators with total security thanks to the introduction of the diversification key $K_d$ specific to the operator. If another encryption function or a one-way hashing function is used, it is necessary to choose or to generate a function necessitating the use of two keys ($K_{A1}$ or $K_{A2}$ and $K_d$). If the function necessitates only one key, then the keys $K_i$ and $K_d$ may be combined. Using "triple DES" functions $35_A$ or $35_B$ is advantageous in that such units are routinely used in the art and available as such as standard subsystems.

Of course, the invention also relates to any microcircuit card usable in a communication entity comprising algorithmic processing and means for receiving operating keys derived from said keys $K_i$, $K_d$, one of the keys ($K_i$) being specific to the entity accommodating the microcircuit card 12 and the other key ($K_d$) being specific to the operator server 14 for the card enabling the use of said entity (the telephone 11). It also relates to an operator server comprising algorithmic processes analogous to those of this kind of card. In particular, the invention relates to any microcircuit card usable in a mobile telephone and comprising two similar algorithmic processing units $35_A$, $35_B$ each having an input E and an output S and means for receiving two operating keys derived from said first and second keys $K_i$, $K_d$. It finally relates to an operator server comprising two similar algorithmic processing units analogous to those of the above kind of card.

The invention claimed is:

1. A computer-readable medium tangibly embodying a program of instructions executable by a computer to control the computer to function for exchanging authentication information between an operator server and a communication entity, wherein,
said entity and said server have the same first key ($K_i$),
server generates a random number (RAND) and sends the generated random number to said entity for the parallel implementation of an algorithm in said entity and said server and for comparison of the results generated in said entity and said server in order to validate said authentication,
said entity and said server using at least one common secret second key ($K_d$) in validating said authentication, and
in validating said authentication, said algorithm implementation in said entity and said server comprises:
algorithmic processes (35A and 35B) using as input data all or a portion of said random number and operating keys derived from said first and second keys, and
a combinatorial process using data derived from said algorithmic processes to generate corresponding precited results.

2. The medium according to claim 1, wherein,
said algorithm comprises two similar algorithmic processes (3 DES) each using two operating keys ($K_{A1}$, $K_{A2}$-$K_d$), and
said communication entity is a mobile telephone.

3. The medium according to claim 1, wherein two respective portions of said random number (RAND), are used as input data of said two similar algorithmic processes.

4. The medium according to claim 3, wherein the less significant bytes of said random number are used as input data for one ($35_A$) of said two similar processes and the more significant bytes of the same random number are used as input data for the other ($35_B$) of said two similar processes.

5. The medium according to claim 2, wherein each of said two similar algorithmic processes consists in executing an encryption function algorithm.

6. The medium according to claim 2, wherein each of said two similar algorithmic processes consists in executing a 3 DES algorithm.

7. The medium according to claim 2, wherein each of said two similar algorithmic processes consists in executing a key-dependent one-way hashing function.

8. The medium according to claim 2, further combining at least one portion of the data obtained from each of said algorithmic processes through an exclusive-OR function (41) to from an authentication word (SRES).

9. The medium according to claim 2, further reconstituting a common encryption key ($K_c$) from portions of data obtained from said algorithmic processes.

10. The medium according to claim 2, wherein two respective portions of said first key ($K_i$) are used first operating keys for said two similar algorithmic processes.

11. The medium according to claim 9, wherein the less significant bytes of said first key are used as the first operating key of one ($35_A$) of the two similar processes and the more significant bytes of said first key are used as the first operating key of one other ($35_B$) of the two similar processes.

12. The medium according to claim 2, wherein two respective portions of said random number (RAND), are used as input data of said two similar algorithmic processes.

13. A method of exchanging authentication information, comprising the steps of:
an operator server communicating with a communication entity;
said entity and said server using a same first key ($K_i$) stored respectively in said entity and said server;
said server generating a random number (RAND) and sending the generated random number to said entity for storage and use in parallel implementation of an algorithm in said entity and said server and for comparison of results generated in said entity and said server as part of an exchange of authentication information in order to validate said authentication; and
said entity and said server using at least one common secret second key ($K_d$) in validating said authentication, wherein,
said operator server and said communication entity comprise hardware components, and
in validating said authentication, said algorithm implementation in said entity and said server use i) algorithmic processes (35A and 35B) using as input data all or a portion of said random number and operating keys derived from said first and second keys, and ii) a combinatorial process using data derived from said algorithmic processes to generate corresponding precited results.

14. The method according to claim 13, wherein said algorithm comprises two similar algorithmic processes (3 DES) each using two operating keys ($K_{A1}$, $K_{A2}$-$K_d$).

15. The method according to claim 13, wherein two respective portions of said random number (RAND), are used as input data of said two similar algorithmic processes.

16. The method according to claim 15, wherein the less significant bytes of said random number are used as input data for one ($35_A$) of said two similar processes and the more significant bytes of the same random number are used as input data for other ($35_B$) of said two similar processes.

17. The method according to claim 14, wherein,
each of said two similar algorithmic processes consists in executing one of an encryption function algorithm, a 3 DES algorithm, and a key-dependent one-way hashing function, and
said communication entity is a mobile telephone.

18. A method of exchanging authentication information between an operator server and a communication entity, comprising the steps of:
an operator server communicating with a communication entity;
one of said entity and said server storing a first key common to said entity and said server and uses a random number for parallel implementation of an algorithm in said entity and said server and for comparison of the results generated in said entity and said server in order to validate said authentication; and
one of said entity and said server storing at least one secret second key common to said entity and said server, wherein,
in validating said authentication, said algorithm implementation executes
algorithmic processes using as input data all or a portion of said random number and operating keys derived from said first and second keys, and
a combinatorial process using data derived from said algorithmic processes to generate corresponding precited results.

19. The method of claim 18, wherein,
said entity stores the first key common to said entity and said server and receives the random number from said server for the parallel implementation of the algorithm in said entity and said server and for comparison of the results generated in said entity and said server in order to validate said authentication, said entity stores the at least one secret second key common to said entity and said server, and in validating said authentication, said algorithm implementation in said entity executes algorithmic processes using as input data all or a portion of said random number and operating keys derived from said first and second keys, and a combinatorial process using data derived from said algorithmic processes to generate corresponding precited results.

20. The method of claim 18, wherein, said server stores the first key common to said entity and said server, said server generates the random number and sends the generated random number to said entity for the parallel implementation of the algorithm in said entity and said server and for comparison of the results generated in said entity and said server in order to validate said authentication, said server stores the at least one secret second key common to said entity and said server, and in validating said authentication, said algorithm implementation in said server executes algorithmic processes using as input data all or a portion of said random number and operating keys derived from said first and second keys, and a combinatorial process using data derived from said algorithmic processes to generate corresponding precited results.

* * * * *